US008984083B2

(12) United States Patent
Engel et al.

(10) Patent No.: US 8,984,083 B2
(45) Date of Patent: Mar. 17, 2015

(54) SYSTEM AND METHOD TO INTEGRATE MEASUREMENT INFORMATION WITHIN AN ELECTRONIC LABORATORY NOTEBOOK ENVIRONMENT

(75) Inventors: Glenn R. Engel, Snohomish, WA (US); William R. Pritchard, Arlington, WA (US); Glen L. Purdy, Jr., Snohomish, WA (US); Jan Schiefer, Seattle, WA (US); Jefferson B. Burch, Palo Alto, CA (US)

(73) Assignee: Keysight Technologies, Inc., Santa Rosa, CA (US)

(*) Notice: Subject to any disclaimer, the term of this patent is extended or adjusted under 35 U.S.C. 154(b) by 1539 days.

(21) Appl. No.: 12/139,521

(22) Filed: Jun. 16, 2008

(65) Prior Publication Data

US 2009/0313347 A1    Dec. 17, 2009

(51) Int. Cl.
*G06F 17/30*    (2006.01)
*G06F 15/16*    (2006.01)

(52) U.S. Cl.
CPC ........................................ *G06F 15/16* (2013.01)
USPC ........... 709/212; 709/246; 709/224; 709/203; 709/225; 709/217; 710/19; 714/15

(58) Field of Classification Search
CPC ....................................................... G06F 15/16
USPC ........................................... 709/212, 203, 224
See application file for complete search history.

(56) References Cited

U.S. PATENT DOCUMENTS

| 5,744,962 | A | 4/1998 | Alber | |
|---|---|---|---|---|
| 6,681,195 | B1 | 1/2004 | Poland | |
| 7,249,117 | B2* | 7/2007 | Estes | 706/52 |
| 7,882,055 | B2* | 2/2011 | Estes | 706/52 |
| 8,015,143 | B2* | 9/2011 | Estes | 706/52 |
| 2006/0229057 | A1* | 10/2006 | Farrugia et al. | 455/403 |
| 2007/0203693 | A1* | 8/2007 | Estes | 704/9 |
| 2007/0208800 | A1* | 9/2007 | Frohlich et al. | 709/203 |
| 2007/0286154 | A1* | 12/2007 | Takehara | 370/350 |
| 2008/0016020 | A1* | 1/2008 | Estes | 706/52 |

\* cited by examiner

*Primary Examiner* — Jude Jean Gilles

(57) ABSTRACT

Capability to record relevant aggregated data via a test and measurement instrument interface through a software agent. The agent resides within the test and measurement instrument and gathers the information when activated. The information can be measurement data; measurement setup parameters; test system topology; user notes, brief descriptions, audio recordings or pen input; pictures; or attached documents. The agent can communicate directly to an electronic laboratory notebook server or can store the information on a portable computer readable media (CRM). A user can upload the information from the portable CRM to the server. The user can access the information via a PC workstation.

20 Claims, 3 Drawing Sheets

SYSTEM AND METHOD TO INTEGRATE MEASUREMENT INFORMATION WITHIN AN ELECTRONIC LABORATORY NOTEBOOK ENVIRONMENT

BACKGROUND OF THE INVENTION

Engineers and scientists often use test and measurement instruments in their daily routine to make measurements related to their work. The data collected from these measurements is important to retain for later reference, such as for use in a patent application. The data is maintained in a personal laboratory notebook as part of a strict workflow. The test and measurement instrument can be a standalone measuring instrument, for example, an oscilloscope, or a Personal Computer (PC) based measuring instrument wherein a computer controls the test and measuring instrument.

Not very long ago, the workflow required hardcopy paper notebooks, pasted printouts of graphs, and handwritten notes. Unfortunately, many engineers do not make a habit of recording information into their laboratory notebook on a regular basis. This has been attributed to the tedious nature of hand writing the content, and printing supporting documentation.

Electronic Laboratory Notebooks (ELN), like their paper counterparts, aid in recording the daily thoughts and experiments of bench scientists and engineers. Ideally, ELNs contain data that flows automatically from instruments and can be read by all members of the technical staff. ELN pages are date- and time-stamped, and all changes tracked and authenticated. Earlier versions can also be reconstructed.

Numerous configuration options exist for an ELN system to cater to the workflows in a research and development environment. The workflows can range from a free-form structure in a research facility to a highly organized data entry structure in chemical analysis facility.

Mentioned earlier, the ELN environment is meant to have a seamless data flow between laboratory instruments and the server. However, in practice, this is rarely realized due to the 'self centric' design of instruments and inadequate interoperability between instruments and the ELN server.

In a workflow requiring highly structured data entry, the collection and storage of measurement records can be inconvenient for the user and can make recordkeeping within the ELN an inefficient experience. The inconvenience and inefficiency arises because setup parameters, test system topology, and other relevant information on the laboratory experiment must be identified, selected for entry, arranged in a form that is usable in an ELN context, and then sent to an ELN server at each record entry.

This makes communicating with the ELN server burdensome, resulting in a tedious workflow and an overwhelming experience for the user.

Accordingly, a need exists to simplify the collection of the features, parameters, test conditions, and data relevant to an experiment in an ELN environment.

DETAILED DESCRIPTION

Figure 1:
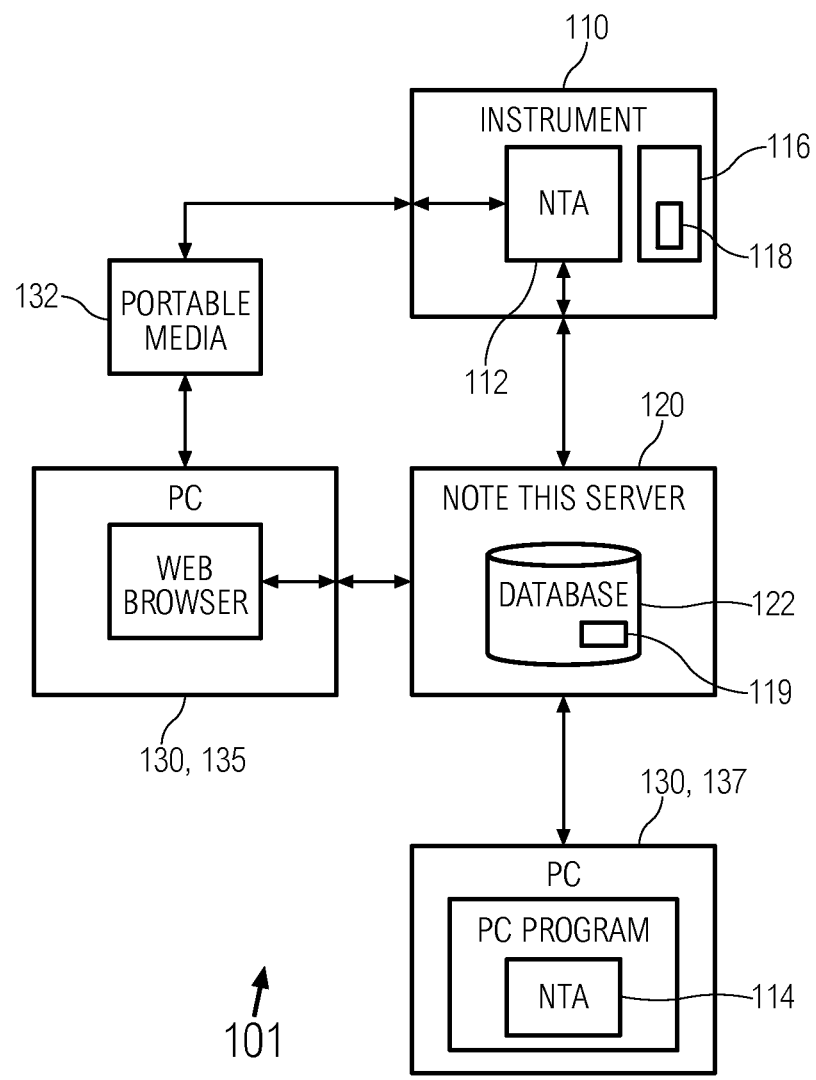
FIG. 1 is a diagram of a system that gathers aggregated data within an electronic laboratory notebook environment.

This description herewith assists with storage and retrieval of information pertaining to a measurement in a manner that is easy for the user. The measurement information or aggregated data is stored to and retrieved from an ELN server. The user can then format, review, print or reproduce the data from the ELN server.

The present invention includes a software agent embedded in a test and measurement instrument to perform the task of gathering the aggregated data, and subsequently storing the data, preferably directly onto the ELN server.

To address the problems described above, a system and method is proposed that enables test and measurement instruments to record relevant data onto the ELN server without having the scientist or engineer tediously search for or select information during or after each measurement. A 'Note This' software Agent (NTA) provides this functionality within the test and measurement instrument to aggregate the relevant data. The mnemonic 'Note This', is an aid to the user to associate the collection of the aggregated data in a streamlined workflow, whereby the user is not burdened by individually selecting the data to be sent to the ELN server after each measurement. The 'Note This' feature can also be a software application running on a PC.

When initiated, the NTA gathers the contents of the aggregated data before storing it on the server. This can be performed automatically using a pre-configured setup or by interacting with the user to provide a selection to choose from. Once the information to be sent to the server is identified, the agent can store the information on a computer readable media (CRM), for example a Universal Serial Bus (USB) Flash drive or a hard drive. Alternatively, the NTA can attempt direct communication with the server via an established network interface such as LAN (10/100/1000BT) or WIFI. The NTA can authenticate itself to the server by providing user credentials (for example a username and password) and subsequently transfer the data to the server.

A trigger activates the NTA to gather the information to be sent to the ELN server. The trigger can be a signal input, for example via a soft or hard-key menu button on the test and measurement instrument or a PC based program that communicates with the test and measurement instrument. Alternatively, the NTA can also be activated when a specific criteria with respect to the measurement is met, for example when measurement data falls within or outside a specified limit, or when a computed value of the data is outside a limit.

A timer within the instrument can trigger the NTA to collect pre-selected aggregated data at pre-set intervals, for example every minute, every hour or once a day, and may communicate the aggregated data to the server without user interaction. If the NTA is part of a test system, the test system itself can command the NTA to initiate the transfer.

The aggregated data transferred to the ELN server can include, but is not limited to:
 i. Measurement data;
 ii. Measurement setup parameters;
 iii. Test system topology;
 iv. Calibration settings;
 v. Correction data;
 vi. User notes; and
 vii. Attached documents.

The 'Note This' feature can also be used to annotate marked values or touch screen locations with additional information such as text or voice recordings. The information described in ii-v above can also be termed as configuration information. User notes can include descriptions and annotations in the form of a text file, recorded audio, pictures or attached documents. User notes can be entered through a user keyboard, a keypad, pen input, microphones, cameras, or any other suitable input means as understood by those skilled in the art.

FIG. 1 is a diagram of a system that generates the aggregated data within an electronic laboratory notebook environment 101.

A test and measurement instrument 110, an ELN server 120, and PC workstations 130 comprise elements in the networked environment 101.

A 'Note This' software Agent (NTA) 112 resides within the test and measurement instrument 110. The NTA 112 communicates with a database 122 within the server 120. The NTA communicates with the server 120 to send aggregated data 118 described above to update the database 122 on the server 120. The aggregated data 118 is part of a storage section 116 of the test and measurement instrument 110. The database 122 may store the information as a record 119 in the database 122 or it may store part of the data as a file 119 with a database pointer to the file 119.

PC workstations 130 enable access to the server 120 to view and update the contents of the database 122. The PC workstation 135 can also upload contents of the aggregated data 118 if direct connectivity between the test and measurement instrument 110 and the server 120 is not available. In this situation, the user can save the information collected by the NTA 112 on a portable CRM 132, for example, a USB Flash drive, and upload the aggregated data to the server 120 through the PC workstation 135.

Some test and measurement instruments are controlled through software applications on PC workstations. A Vector Signal Analyzer 89600 by Agilent Technologies, Inc. of Santa Clara, Calif. is an example of such a PC based test and measurement instrument. In this instance, an NTA 114 is within the PC workstation 137 and can interact with the server 120 in the same way as the test and measurement instrument 110. The NTA 114 can communicate with the server 120 to store settings and measurement data.

Figure 2:
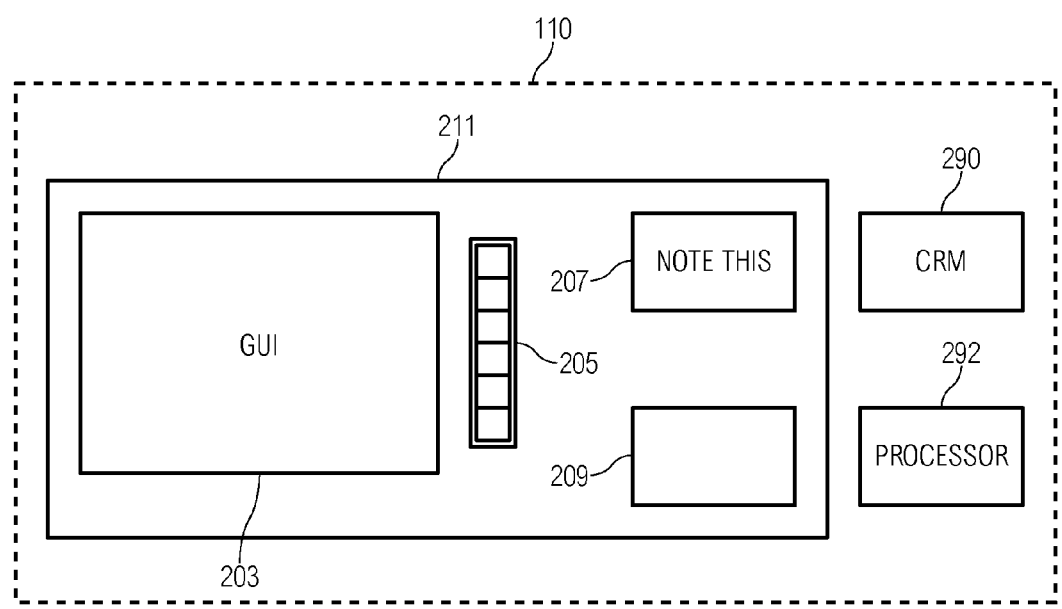
FIG. 2 is measurement instrument describing the 'Note This' feature on the instrument.

FIG. 2 shows the test and measurement instrument 110. Identified in FIG. 2 are components on the front panel 211 of the instrument 110, as well as a computer readable media ("CRM") 290 and a processor 292 located within the instrument 110.

The front panel 211 of the test and measurement instrument 110 comprises a touch sensitive GUI 203 and a row of programmable soft-keys 205. An interface (user button) for receiving a trigger signal input to activate the NTA 112 can be through the touch sensitive GUI 203, the programmable soft-keys 205, or a dedicated hard-key 207. When activated, the NTA 112 is set into action to perform the steps described below in FIG. 3. The hard-key 207 clearly displays the words 'Note This' on the on the front panel 211 to identify the function and to activate the NTA 112. An instrument can have a pointing device (not shown), for example a mouse device, connected to the instrument as an additional selection interface.

A USB port 209 is shown on the front panel of the test and measurement instrument 110 to receive a portable USB Flash CRM.

The CRM 290 contains code for providing instructions to and for execution by the test and measurement instrument 110 in an embodiment of the invention. The CRM 290 can be, for example, a ROM, a RAM, a DVD, a hard drive, or other CRM known in the art. The storage section 116 (FIG. 1) used to store the aggregated data 118 and can be part of the CRM 292.

The processor 292 is used to execute the NTA 112 and to gather the data upon receiving the signal input.

Figure 3:
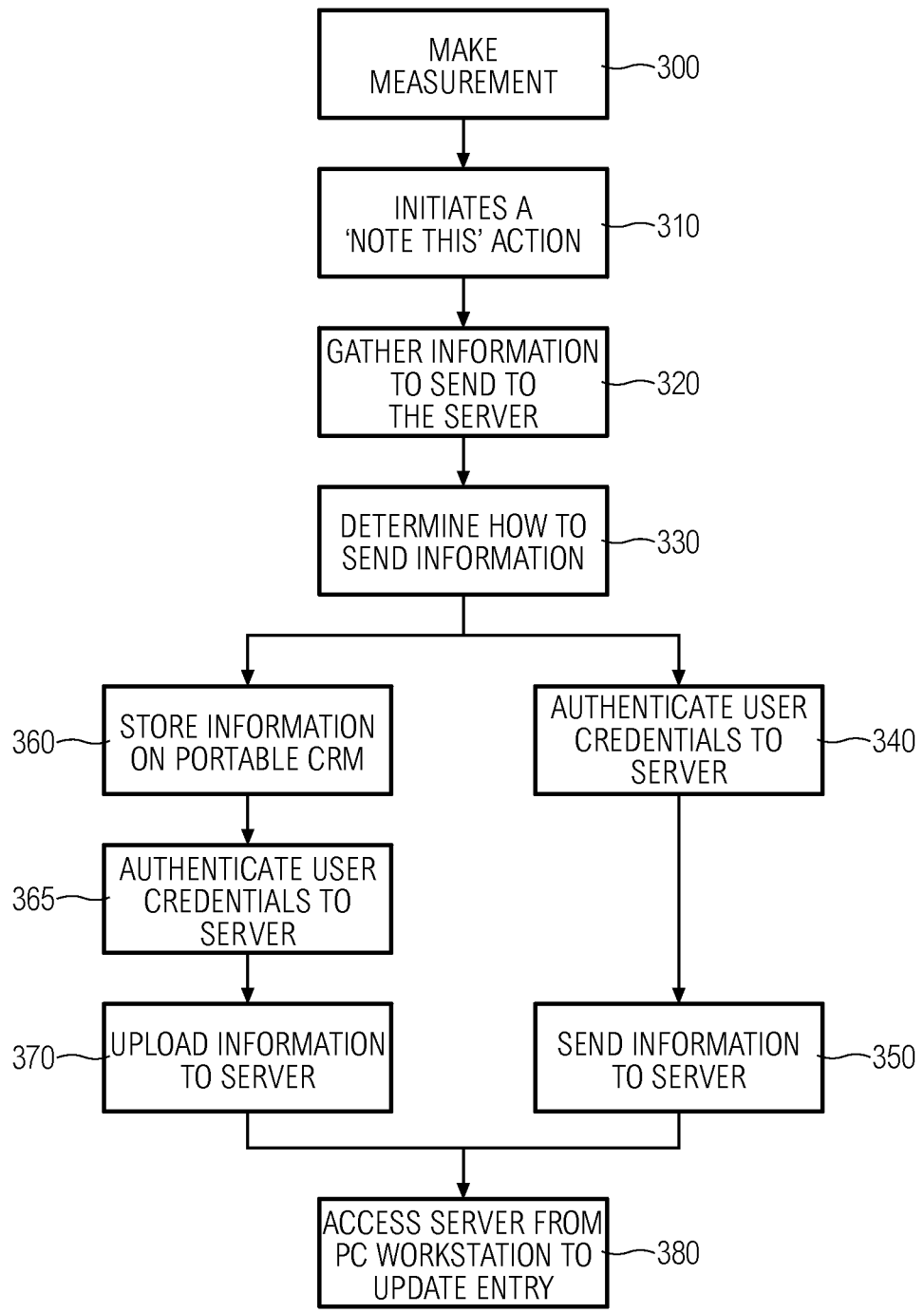
FIG. 3 is a flow chart showing steps to implement an embodiment of the invention.

FIG. 3 is a flow chart showing a sequence of instructions the test and measurement instrument 110 will perform when executing instructions of the NTA. The code resides on the computer readable media 290 of FIG. 2 and is used by the processor 292 within the test and measurement instrument 110 to execute the instructions. Alternatively, the code can be executed by a PC workstation 137 external to the test and measurement instrument.

Block 300 describes steps to take when making a measurement using the test and measurement instrument 110 fitted with an NTA 112.

Block 310 describes the NTA 112 being activated by a trigger. This can be done by any one of the trigger means described above in FIG. 2. Alternatively, if the NTA is on the PC Workstation 137, a NTA 114 can be initiated by accessing a page or sending a remote command.

Block 320 describes gathering the data pertaining to the measurement to be sent to the server 120. This information comprises the configuration information, measurement data and user notes as described above.

Block 330 describes the option of sending the information to the server 120. This can be via a conventional network or using a portable CRM 132.

Block 340 describes authenticating user access to the server. This can involve sending user credentials.

Block 350 describes sending the aggregated data onto the server 120.

Block 360 describes using a portable CRM 132 to temporarily store the aggregated data.

Block 365 describes a similar step taken in Block 340. It describes authenticating user access to the server upon connecting to the server through the PC workstation 130.

Block 370 describes uploading the information to the server 120 through the PC workstation 130.

Block 380 describes accessing the server 120 from the PC workstation 135 to update the laboratory notebook entry if necessary. Once available in the database 122, the user or other users can access, modify, or create a well-formatted laboratory notebook entry for the measurement just concluded.

While the embodiments described above constitute exemplary embodiments of the invention, it should be recognized that the invention can be varied in numerous ways without departing from the scope thereof. It should be understood that the invention is only defined by the following claims.

The invention claimed is:

1. A data transfer system comprising:
   a test and measurement instrument;
   a data processor of the test and measurement instrument for generating aggregated data, the aggregated data comprising measurement data and user notes related to a measurement performed by the test and measurement instrument; and
   an innerface of the test and measurement instrument for transmitting the aggregated data to an external computer readable media for storage.

2. The system of claim 1, wherein the test and measurement instrument is a standalone measuring instrument or a PC based measuring instrument.

3. The system of claim 1, wherein the external computer readable media is an Electronic Laboratory Notebook server or a portable USB Flash drive.

4. The system of claim 1, further comprising a user button on the front panel of the test and measurement instrument, the user button triggering the data processor to generate the aggregated data.

5. The system of claim 4, wherein the user button is a hard key or a soft key on the test and measurement instrument.

6. A method of aggregating and transferring measurement data and user notes related to a measurement performed by a test and measurement instrument, the method comprising the steps of:
   aggregating the measurement data and the user notes using a data processor to generate aggregated data; and
   transferring the aggregated data from the test and measurement instrument to an external computer readable media for storage and access.

7. The method of claim 6, further comprises the step of selecting the contents of aggregated data to be generated.

8. The method of claim 6, wherein the external computer readable media is a portable USB Flash drive and the method further comprises the step uploading the aggregated data from the USB Flash drive to a server via a PC workstation.

9. The method of claim 8, further comprises the step of accessing the aggregated data from the server via a PC workstation.

10. The method of claim 6, wherein the external computer readable media is a database on a server and the method further comprises the step establishing a connection with the server.

11. The method of claim 10, further comprises the step of accessing the aggregated data from the server via a PC workstation.

12. The method of claim 10, wherein the server is an Electronic Laboratory Notebook server.

13. The method of claim 6, wherein the user notes comprises information in the form of a text file, recorded audio, pictures or attached documents.

14. A non-tangible computer readable media containing code thereon, the code providing instructions for aggregating and transferring measurement data and user notes related to a measurement performed by a test and measurement instrument, the code providing instructions to a processor for executing the steps of:
   aggregating the measurement data and the user notes using the processor to generate aggregated data; and
   transferring the aggregated data from the test and measurement instrument to an external computer readable media for storage and access.

15. The non-tangible computer readable media containing code thereon as recited in claim 14, wherein the external readable media is a database on a server and the code providing instructions to the test and measurement instrument for executing the additional step of establishing a connection to the server.

16. The non-tangible computer readable media containing code thereon as recited in claim 15, wherein the server is configured as an Electronic Laboratory Notebook server.

17. The non-tangible computer readable media containing code thereon as recited in claim 14, the code providing, instructions to the test and measurement instrument for executing the additional step of receiving as an input, details of the contents of the aggregated data to be gathered in response to receiving a trigger signal input.

18. The non-tangible computer readable media containing code thereon as recited in claim 14, wherein the external computer readable media is a USB Flash drive.

19. The non-tangible computer readable media containing code thereon as recited in claim 14, wherein user notes comprises information in the form of a text file, recorded audio, pictures or attached documents.

20. The non-tangible computer readable media containing code thereon as recited in claim 14, the code providing instructions to the test and measurement instrument for executing the additional step of making a measurement on the test and measurement instrument.

\* \* \* \* \*